US010934856B2

(12) United States Patent
Srinivasan et al.

(10) Patent No.: US 10,934,856 B2
(45) Date of Patent: *Mar. 2, 2021

(54) GAS TURBINE ENGINES WITH IMPROVED LEADING EDGE AIRFOIL COOLING

(71) Applicant: HONEYWELL INTERNATIONAL INC., Morris Plains, NJ (US)

(72) Inventors: Balamurugan Srinivasan, Karnataka (IN); Sridharan Reghupathy Narayanan, Karnataka (IN); Karthikeyan Paramanandam, Karnataka (IN); Chandiran Jayamurugan, Karnataka (IN); Malak Fouad Malak, Tempe, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 350 days.

This patent is subject to a terminal disclaimer.

(21) Appl. No.: 16/155,913

(22) Filed: Oct. 10, 2018

(65) Prior Publication Data
US 2019/0106992 A1  Apr. 11, 2019

Related U.S. Application Data

(63) Continuation of application No. 14/515,131, filed on Oct. 15, 2014, now Pat. No. 10,119,404.

(51) Int. Cl.
*F01D 5/18* (2006.01)
*F01D 5/14* (2006.01)
(Continued)

(52) U.S. Cl.
CPC .............. *F01D 5/187* (2013.01); *F01D 5/147* (2013.01); *F01D 5/188* (2013.01); *F02C 3/04* (2013.01);
(Continued)

(58) Field of Classification Search
CPC . F01D 5/18; F01D 5/186; F01D 5/187; F01D 5/147; F05D 2240/121;
(Continued)

(56) References Cited

U.S. PATENT DOCUMENTS 3,574,481 A     4/1971  Pyne
4,474,532 A *  10/1984  Pazder .................... F01D 5/187
                                                    416/97 R
(Continued)

FOREIGN PATENT DOCUMENTS

EP          0416542 A1     3/1991
EP          1043479 A2    10/2000
(Continued)

OTHER PUBLICATIONS

Extended EP search report for Application No. 15188850.0-1610 dated Apr. 25, 2016.
(Continued)

*Primary Examiner* — Alain Chau
(74) *Attorney, Agent, or Firm* — Lorenz & Kopf, LLP

(57) ABSTRACT

An airfoil for a gas turbine engine includes a body with a first side wall and a second side wall joined at a leading edge and a trailing edge, the first side wall having a first interior surface and the second side wall having a second interior surface. The airfoil further includes an internal wall disposed within of the body and extending between the first interior surface and the second interior surface to define a supply passage and a leading edge passage. The internal wall defines a plurality of cooling holes to direct cooling air from the supply passage to the leading edge passage such that the cooling air impinges upon the leading edge. The airfoil further includes a first plurality of grooves formed in the first interior surface, each the first plurality of grooves extending in a chordwise direction within the leading edge passage.

20 Claims, 9 Drawing Sheets

(51) Int. Cl.
*F02C 3/04* (2006.01)
*F02C 7/04* (2006.01)
*F02C 7/18* (2006.01)

(52) U.S. Cl.
CPC .................. *F02C 7/04* (2013.01); *F02C 7/18* (2013.01); *F05D 2220/32* (2013.01); *F05D 2240/303* (2013.01); *F05D 2240/35* (2013.01); *F05D 2260/201* (2013.01); *F05D 2260/2214* (2013.01); *Y02T 50/60* (2013.01)

(58) Field of Classification Search
CPC ....... F05D 2240/303; F05D 2260/2212; F05D 2260/2214; F05D 2260/22141; F05D 2260/201; Y02T 50/676
See application file for complete search history.

(56) References Cited

U.S. PATENT DOCUMENTS

| | | | |
|---|---|---|---|
| 4,786,233 A | | 11/1988 | Mitsutaka |
| 5,100,293 A | | 3/1992 | Anzai |
| 5,232,343 A | | 8/1993 | Butts |
| 5,468,125 A | | 11/1995 | Okpara et al. |
| 5,586,866 A | | 12/1996 | Wettstein |
| 6,068,445 A | * | 5/2000 | Beeck ................. F01D 5/187 416/96 A |
| 6,116,854 A | | 9/2000 | Yuri |
| 6,142,734 A | | 11/2000 | Lee |
| 6,227,804 B1 | * | 5/2001 | Koga ................. F01D 5/187 415/115 |
| 6,406,260 B1 | * | 6/2002 | Trindade ............. F01D 5/187 415/115 |
| 6,607,355 B2 | | 8/2003 | Cunha et al. |
| 6,884,036 B2 | * | 4/2005 | Shi ................... F01D 5/187 416/97 R |
| 6,890,153 B2 | | 5/2005 | Demers |
| 6,929,445 B2 | * | 8/2005 | Zatorski ............. F01D 9/065 415/115 |
| 7,104,757 B2 | | 9/2006 | Gross |
| 7,137,781 B2 | | 11/2006 | Harvey |
| 7,753,650 B1 | | 7/2010 | Liang |
| 8,070,443 B1 | * | 12/2011 | Liang ................. F01D 5/187 416/97 R |
| 8,083,485 B2 | * | 12/2011 | Chon ................. F01D 5/187 416/97 R |
| 8,231,349 B2 | | 7/2012 | Naik |
| 8,348,613 B2 | | 1/2013 | Gregg |
| 8,376,706 B2 | | 2/2013 | Bunker |
| 8,562,295 B1 | * | 10/2013 | Liang ................. F01D 5/186 416/97 R |
| 8,757,974 B2 | * | 6/2014 | Propheter-Hinckley ..... F01D 5/188 416/97 R |
| 2003/0035726 A1 | | 2/2003 | Tiemann |
| 2004/0096313 A1 | * | 5/2004 | Harvey ............... F01D 5/187 415/115 |
| 2004/0208744 A1 | | 10/2004 | Shi |
| 2007/0297916 A1 | * | 12/2007 | Levine ............... F01D 5/187 416/96 R |
| 2007/0297917 A1 | | 12/2007 | Levine |
| 2009/0047136 A1 | | 2/2009 | Chon et al. |
| 2009/0074575 A1 | | 3/2009 | Propheter-Hinckley |
| 2009/0317234 A1 | * | 12/2009 | Zausner .............. F01D 5/187 415/115 |
| 2010/0254824 A1 | | 10/2010 | Naik |

FOREIGN PATENT DOCUMENTS

| | | |
|---|---|---|
| EP | 1191189 A1 | 3/2002 |
| EP | 1944467 A2 | 7/2008 |
| WO | 2016043742 A1 | 3/2016 |

OTHER PUBLICATIONS

Han et al.; 4.2.2.2 Enhanced Internal Cooling of Turbine Blades and Vanes; Turbine Heat Transfer Laboratory Department of Mechanical Engineering Texas A&M University College Station, Texas; 2006.
Extended Exam Report for Application No. 15 188 850.0-1610 dated May 4, 2017.

\* cited by examiner

GAS TURBINE ENGINES WITH IMPROVED LEADING EDGE AIRFOIL COOLING

CROSS-REFERENCE TO RELATED APPLICATIONS

This application is a continuation of U.S. patent application Ser. No. 14/515,131, filed Oct. 15, 2014, now U.S. Pat. No. 10,119,404.

TECHNICAL FIELD

The present invention generally relates to gas turbine engines, and more particularly relates to gas turbine engines with improved turbine airfoil cooling.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. As such, it is desirable to cool the airfoils of the rotor blades and stator vanes to prevent or reduce adverse impact and extend useful life. Mechanisms for cooling turbine airfoils include ducting cooling air through internal passages and then venting the cooling air through holes formed in the airfoil. Internal and film cooling techniques attempt to maintain temperatures that are suitable for material and stress level. However, given the high temperature of engine operation, cooling remains a challenge, particularly in areas such as the airfoil leading edge. The leading edge of the turbine airfoil may be subject to the highest heat load on the airfoil, which may result in oxidation and thermo-mechanical fatigue.

Accordingly, it is desirable to provide gas turbine engines with improved airfoil cooling. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an airfoil for a gas turbine engine is provided. The airfoil includes a body with a first side wall and a second side wall joined at a leading edge and a trailing edge, the first side wall having a first interior surface and the second side wall having a second interior surface. The airfoil further includes an internal wall disposed within the body and extending between the first interior surface and the second interior surface to define a supply passage and a leading edge passage, wherein the internal wall defines a plurality of cooling holes to direct cooling air from the supply passage to the leading edge passage such that the cooling air impinges upon the leading edge. The airfoil further includes a first plurality of grooves formed into the first interior surface by removing portions of the first interior surface such that the first side wall has a reduced thickness within respective grooves of the first plurality of grooves relative to areas in between the respective grooves and areas along and adjacent to the leading edge, each of the first plurality of grooves extending in a chordwise direction within the leading edge passage, wherein each of the first plurality of grooves is formed by a continuously concave curved side wall in cross-section along a radial direction.

In accordance with an exemplary embodiment, a gas turbine engine includes a compressor section configured to receive and compress air; a combustion section coupled to the compressor section and configured to receive the compressed air, mix the compressed air with fuel, and ignite the compressed air and fuel mixture to produce combustion gases; and a turbine section coupled to the combustion section and configured to receive the combustion gases, the turbine section defining a combustion gas path and comprising a turbine rotor positioned within the combustion gas path. The turbine rotor includes a platform at least partially defining the combustion gas path and an airfoil extending from the platform. The airfoil includes a body that includes a first side wall and a second side wall joined at a leading edge and a trailing edge, the leading edge having an apex, and the first side wall having a first interior surface and the second side wall having a second interior surface. The airfoil further includes an internal wall disposed within the body and extending between the first interior surface and the second interior surface to define a supply passage and a leading edge passage, wherein the internal wall defines a plurality of cooling holes to direct cooling air from the supply passage to the leading edge passage such that the cooling air impinges upon the leading edge. The airfoil further includes a first plurality of grooves formed into the first interior surface such that the first side wall has a reduced thickness within respective grooves of the first plurality of grooves relative to areas in between the respective grooves, each of the first plurality of grooves extending in a chordwise direction within the leading edge passage from the internal wall and terminate at a first position upstream of the apex along the chordwise direction, wherein each of the first plurality of grooves has a width and a depth, and wherein the width of each of the first plurality of grooves decreases in the chordwise direction toward the leading edge.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with turbine components having improved cooling characteristics. In particular, exemplary embodiments include turbine airfoils with grooves formed on the interior surfaces of the side walls in the leading edge passage. Such grooves improve the effectiveness of impingement cooling on the leading edge, thus providing more efficient and/or improved cooling characteristics.

Figure 1:
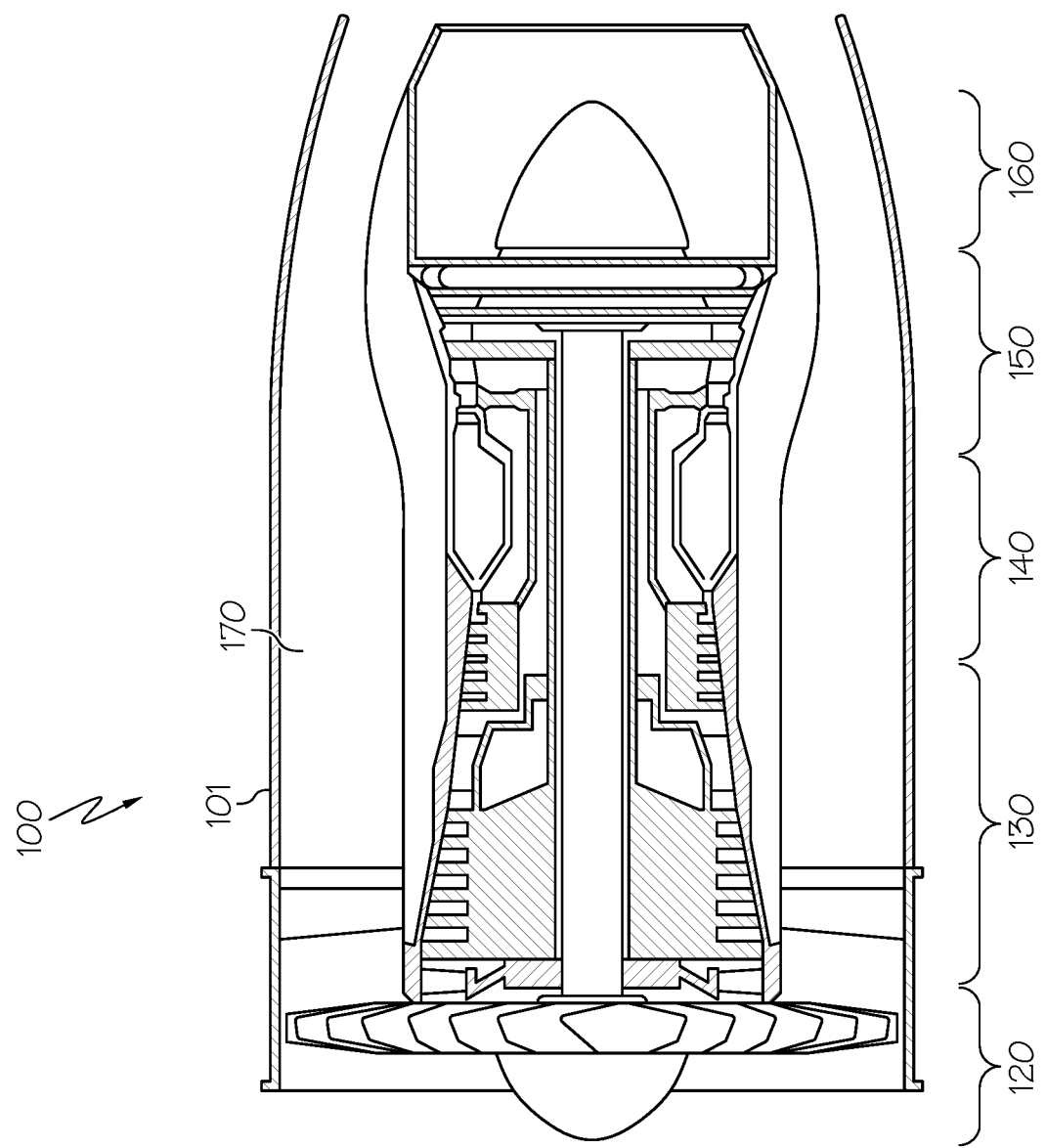
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
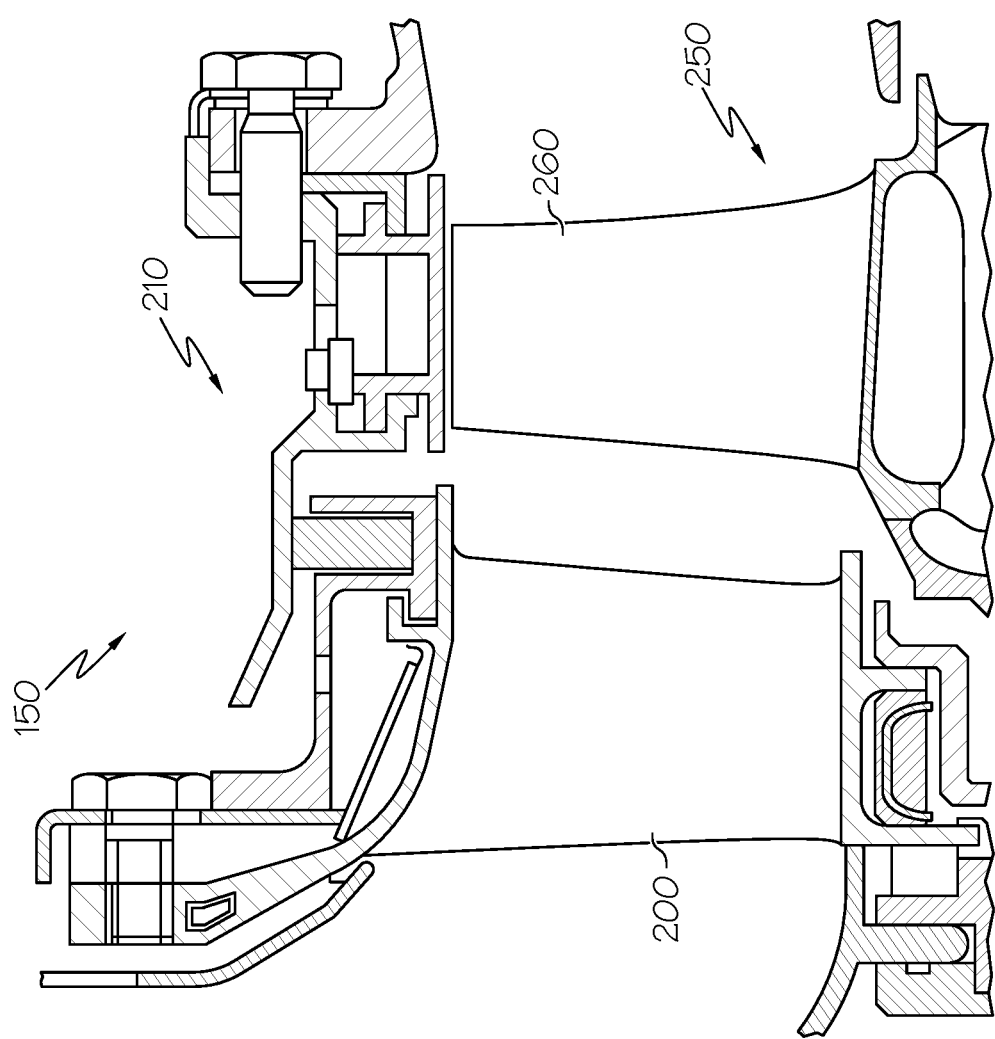
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream combustion section (e.g. combustion section 140 of FIG. 1) is directed. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are cooled, including the rotor 250 and the stator 200, as described in greater detail below.

Figure 3:
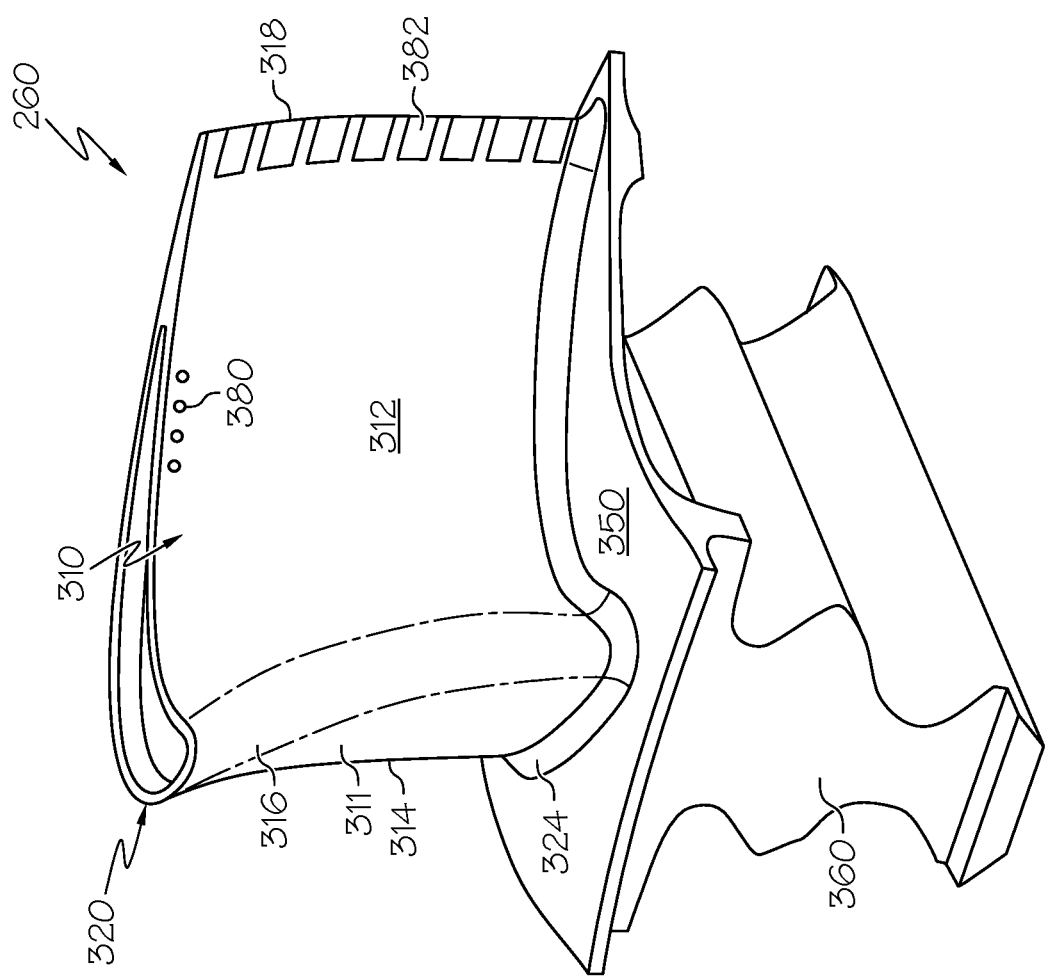
FIG. 3 is an isometric view of a turbine rotor blade of the turbine section of FIG. 2 in accordance with an exemplary embodiment.

FIG. 3 illustrates an exemplary aircraft jet engine turbine rotor blade, such as rotor blade 260 of FIG. 2, removed from a turbine section. FIG. 3 depicts one exemplary embodiment, and other exemplary embodiments may have alternate configurations or arrangements.

The rotor blade 260 includes an airfoil 310, a platform 350 and a root 360. The platform 350 is configured to radially contain turbine airflow within a shroud (e.g., shroud 210 of FIG. 2). The root 360 extends from the underside of the platform and is configured to couple the blade 260 to a turbine rotor disc (not shown). In general, the rotor blade 260 may be made from any suitable material, including high heat and high stress resistant aerospace alloys, such as nickel based alloys, Rene 88, Mar-M-247, single crystal materials, steels, titanium alloys or the like.

The airfoil 310 projects radially outwardly from the platform 350. The airfoil 310 is formed by a body 311 with two side (or outer) walls 312, 314, each having outer surfaces that together define an airfoil shape. The first side wall 312 defines a pressure side with a generally concave shape, and the second side wall 314 defines a suction side with a generally convex shape. In a chordwise direction, the airfoil side walls 312, 314 are joined at a leading edge 316 and a trailing edge 318. As used herein, the term "chordwise" refers to a generally longitudinal dimension along the airfoil from leading edge to trailing edge, typically curved for air flow characteristics. The trailing edge 318 may include trailing edge slots 382, discussed below.

In an axial direction, the airfoil side walls 312, 314 extend from a base 324 at the platform 350 to a blade tip 320. In general, the blade tip 320 is positioned to rotate in close proximity to the shroud 210 (FIG. 2) in order to maximize energy extraction.

As noted above, the rotor blade 260, particularly the airfoil 310, is subject to extremely high temperatures resulting from high velocity hot gases ducted from the combustion section 140 (FIG. 2). If unaddressed, the extreme heat may impact the useful life of an airfoil and/or impact the maximum operating temperature of the engine. As such, cooling is provided for the airfoil 310 to maintain blade temperature at an acceptable level, as described in greater detail below. Such cooling may include an internal cooling system that directs cooling air from the compressor section 130 into inlets in the root 360 and through internal cavities and passages to cool the airfoil 310 via convection and conduction. The air flowing through the internal cooling system may flow out of the airfoil 310 through the trailing edge slots 382 to provide temperature control of the trailing edge 318. Additionally, the cooling air flowing through the internal cooling system may also be supplied to film cooling holes 380 arranged to provide a cooling film of fluid onto the surface of the airfoil 310. In FIG. 3, the film cooling holes 380 are positioned on the blade tip 320, although film cooling holes 380 may be provided in other locations, such as in the area of the leading edge 316 or at any chordwise location along the pressure side wall 312 and/or suction side wall 314.

Figure 4:
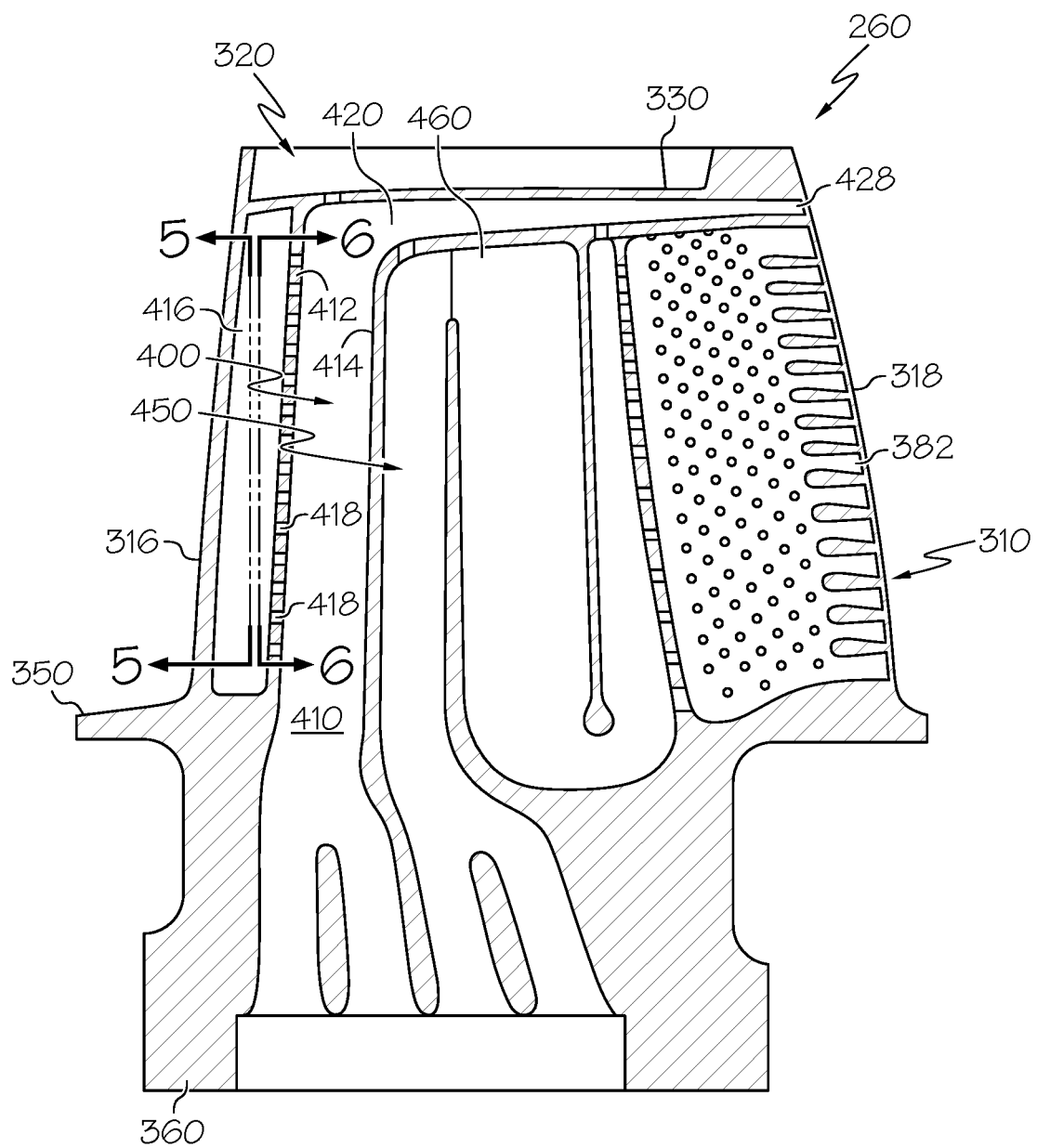
FIG. 4 is a cross-sectional view of the turbine rotor blade of FIG. 3 in accordance with an exemplary embodiment.

FIG. 4 is a partial cross-sectional view of the rotor blade 260 of FIG. 3 in accordance with an exemplary embodiment. As shown, the cross-sectional view may generally correspond to a cross-sectional view through a radial-chordwise plane. As discussed above with reference to FIG. 3, the rotor blade 260 includes the platform 350 and the airfoil 310 with leading edge 316, trailing edge 318, and blade tip 320.

FIG. 4 particularly shows the interior structure of the rotor blade 260 with two cooling circuits 400, 450, although any number of cooling circuits may be provided. Each of the cooling circuits 400, 450 directs cooling air from passages in the root 360 (FIG. 3) and/or rotor discs (not shown) to cool designated portions of the airfoil 310. Such cooling air may be obtained as bleed flow from the compressor section 130 (FIG. 1). As described below, the cooling circuits 400, 450 are formed by the side walls 312, 314 and internal structures that direct the air flow through the airfoil 310.

The first cooling circuit 400 includes a first passage (or chamber) 410 extending in a generally radial direction, as shown in FIG. 4. The first passage 410 is partially formed by internal walls 412, 414, although other embodiments may have alternate configurations. The forward or leading internal wall 412 forms a leading edge passage (or chamber) 416 with the interior surfaces of the side walls 312, 314 (FIG. 3) at the leading edge 316. As shown, the leading edge passage 416 extends in a radial direction along the length of the leading edge 316. As described in greater detail below, the leading internal wall 412 has a number of holes (or nozzles) 418 such that the first passage 410 and the leading edge passage 416 are in fluid communication. In one exemplary embodiment, air flows from the first passage 410 to the leading edge passage 416 such that the first passage 410 may be considered a supply passage. The first cooling circuit 400 further includes a second passage 420 fluidly coupled to the first passage 410 and extending in a generally chordwise direction along the blade tip 320.

Accordingly, during operation, a first portion of cooling air flows through the first passage 410, through the holes 418 in the internal wall 412, and through the leading edge passage 416 to cool the leading edge 316. After striking the internal surface of the leading edge 316, the air, which may now be considered spent air, may exit the leading edge passage 416 through holes (not shown) in the side walls out of the airfoil 310, holes (not shown) in the blade tip 320 out of the airfoil 310, or through another exit location. Generally, however, after striking and cooling the leading edge 316, spent air flows through the leading edge passage 416 in a radially outward direction to one of the exits described above. Additional details about this cooling function will be provided below. A further portion of the cooling air flows through the first passage 410 to the second passage 420 for cooling the blade tip 320 and the trailing edge 318 while exiting the airfoil 310 at outlet 428.

The second cooling circuit 450 includes a passage 460 extending initially in a generally radial direction and transitioning into a serpentine configuration through the airfoil 310, although other embodiments may have alternate configurations. The passage 460 is fluidly coupled to the cooling slots 382 at the trailing edge of the 322 of the airfoil 310. As such, cooling air flows through the passage 460 and exits the airfoil 310 at the cooling slots 382 to thereby cool the side walls 312, 314 (FIG. 3) of the airfoil 310 and/or the trailing edge 318.

Although the first cooling circuit 400 and the second cooling circuit 450 are described as separate circuits, the cooling circuits 400, 450 may be integrated with one another or otherwise be in flow communication. Other configurations are possible. Additional details about cooling the leading edge 316 will now be discussed with reference to FIGS. 5-11.

Figure 5:
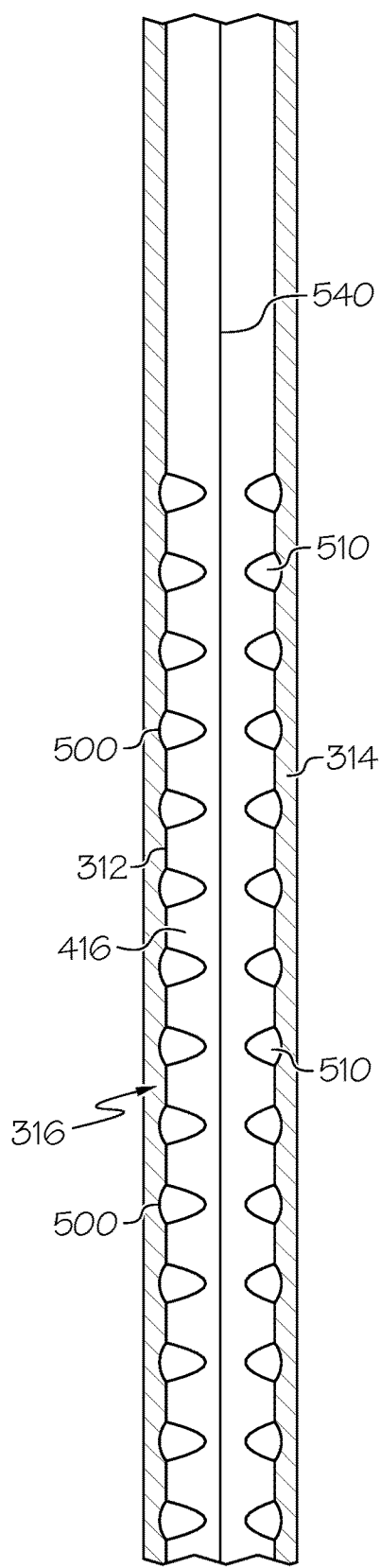
FIG. 5 is a partial sectional view of the turbine rotor blade of FIG. 4 through line 5-5 in accordance with an exemplary embodiment.
Figure 6:
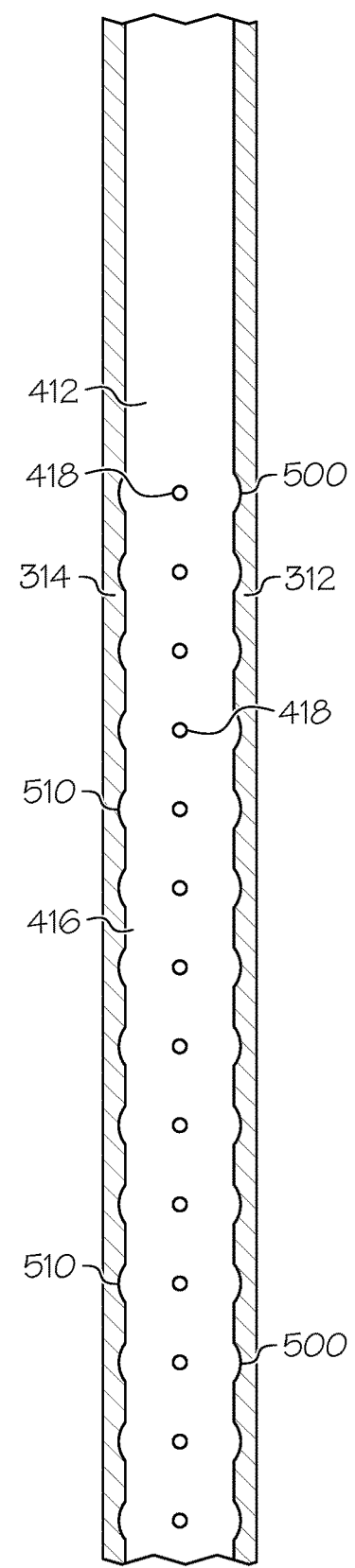
FIG. 6 is a partial sectional view of the turbine rotor blade of FIG. 4 through line 6-6 in accordance with an exemplary embodiment.

FIG. 5 is a sectional view of the airfoil 310 through line 5-5, and FIG. 6 is a sectional view of the airfoil 310 through line 6-6. Generally, in FIG. 4, line 5-5 and line 6-6 extend through approximately the same plane in the leading edge passage 416. However, the view in FIG. 5 is oriented in the forward or leading direction, and the view in FIG. 6 is oriented in the aft or trailing direction.

FIG. 5 partly depicts the portions of the pressure side wall 312 and the suction side wall 314 that meet to form the leading edge 316. The leading edge 316 has interior and exterior surfaces. Generally, the exemplary embodiments below are associated with the interior surfaces of the leading edge 316. With respect to these interior surfaces, the leading edge 316 may be considered the interior surfaces of the walls 312, 314 within the leading edge passage 416. The position or apex 540 of the leading edge 316 may be considered the area and immediately adjacent areas at which the interior surfaces of walls 312, 314 are joined. On the opposing side of the leading edge passage 416, FIG. 6 depicts the leading internal wall 412 extending between the pressure side wall 312 and the suction side wall 314. As noted above, the leading internal wall 412 includes a number of holes 418 that direct cooling air from the first passage 410 (FIG. 4) into the leading edge passage 416 to cool the leading edge 316.

The cooling holes 418 are oriented in the leading internal wall 412 such that cooling air flowing through the cooling holes 418 form jets flowing in a radial or chordwise direction (e.g., parallel to the axial direction) to strike the interior surface of the leading edge 316, particularly the apex (or most forward portions) 590 at which the interior surfaces of the walls 312, 314 are joined, at approximately a 90° angle. As such, the cooling holes 418 may be considered impingement cooling holes that direct cooling air to strike the leading edge 316 in a perpendicular manner to improve heat transfer from the leading edge 316 to the cooling air.

At times, the impingement cooling air flowing through the cooling holes 418 may encounter other forms of air or air flow within the leading edge passage 416. As noted above, spent air that has already impinged the interior surface of the leading edge 316 may flow through the leading edge passage 416 in a radial direction (e.g., perpendicular to the impingement jets through the cooling holes 418). Unless addressed, the spent air may inhibit the ability to the impingement jets to effectively strike and cool the leading edge 316. As described below, the side walls 312, 314 and leading edge passage 416 have characteristics to address this issue.

As best shown in FIG. 5, a first radially extending row of grooves (or scoops) 500 is formed in the interior surface of the pressure side wall 312, and a second radially extending row of grooves (or scoops) 510 is formed in the interior surface of the suction side wall 314. Within each row, the grooves 500, 510 are arranged parallel to one another, as best shown in FIG. 5. One row of grooves 500, 510 is provided on each of the side walls 312, 314, although other configurations are possible. Generally, the area between adjacent grooves 500, 510 within a respective row is relatively flat or otherwise planar with the other portions of the respective interior surface. Generally, these grooves 500, 510 at the leading edge 316 function to improve the cooling effectiveness of the impingement jets flowing through holes 418.

The grooves 500, 510 may improve leading edge cooling in a number of ways. In one exemplary embodiment, the grooves 500, 510 result in additional surface area at the leading edge 316 that provides the cooling air with additional contact area, thereby improving heat transfer. The grooves 500, 510 may also function to alter the flow path to minimize or mitigate the cross flow interaction of cooling air and spent cooling air. Additional details about the grooves 500, 510 are provided below.

Figure 7:
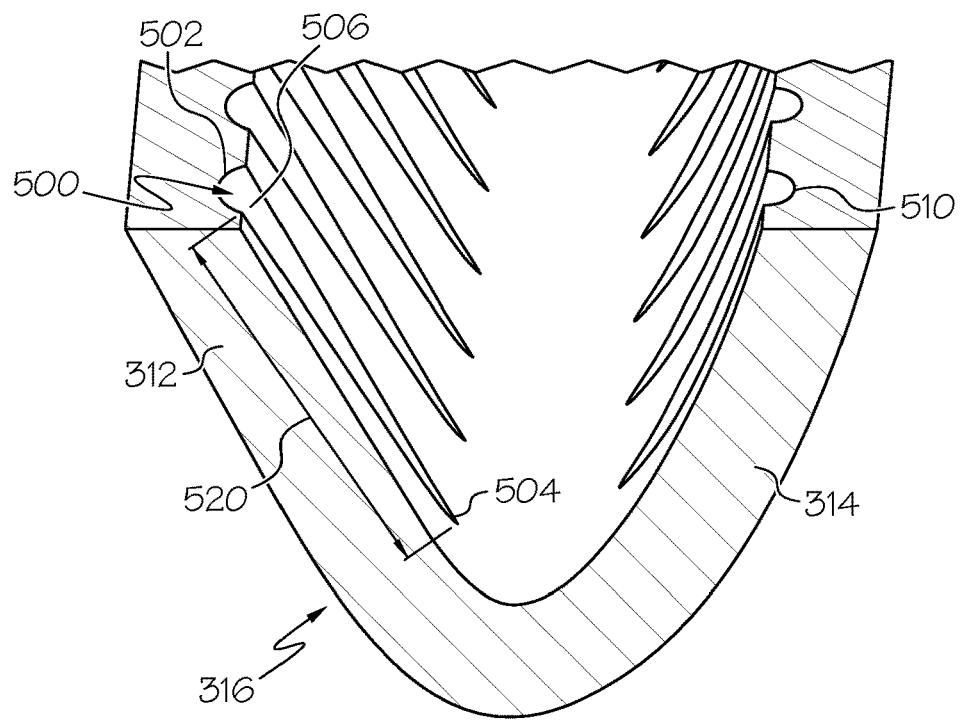
FIG. 7 is a partial, isometric view of a portion of the turbine rotor blade of FIG. 4 in accordance with an exemplary embodiment.
Figure 8:
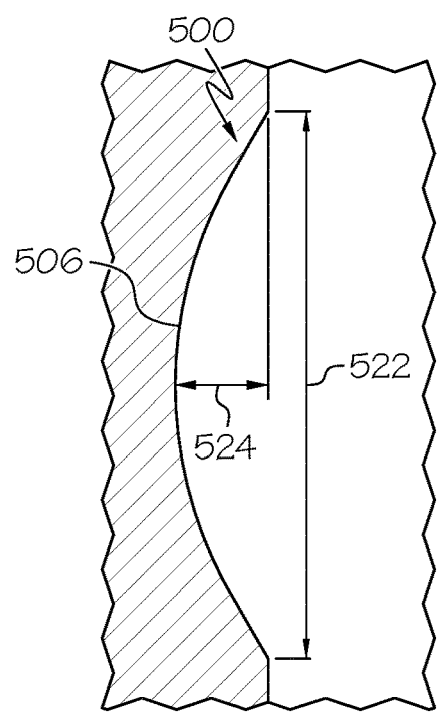
FIG. 8 is a cross-sectional view of a groove of the turbine rotor blade in FIG. 7 in accordance with an exemplary embodiment.

Reference is additionally made to FIG. 7, which is a partial, isometric view of a portion of the leading edge 316 that more clearly depicts the arrangement of the grooves 500, 510. As shown on an exemplary groove 500 in FIG. 7, but equally applicable to grooves 510, each groove 500, 510 extends in an axial or chordwise direction from a first end 502 to a second end 504 and may be formed by one or more groove walls 506. A cross-sectional view of one of the grooves 500, 510 (depicted as groove 500) is shown in FIG. 8. As shown in the views of FIGS. 7 and 8, each groove 500, 510 may be considered to have a length 520 from the first end 502 to the second end 504, a width 522 in a radial direction between the edges of the groove wall 506, and a depth 524 from the plane of the interior surface of the respective side wall 312, 314 to the bottom or lowest point of the groove wall 506. The first end 502 of the grooves 500, 510 may extend from the internal wall 412. In other embodiments, the first end 502 may be offset from the internal wall 412. The second end 504 may extend to apex 590, join a corresponding second end of the opposing groove, or terminate upstream of the apex 490, as necessary or desired.

As best shown in FIGS. 5 and 7, the first end 502 may be the widest portion of the groove 500, 510 such that the width 522 of the groove 500, 510 decreases along the length 520 as the wall 506 converges to the second end 504. In some exemplary embodiments, the depth 524 of the groove 500, 510 may also decrease along the length 520. In one exemplary embodiment, this configuration enables the ability to maintain the wall thickness of the leading edge 316, thereby improving thermo-mechanical stability.

The grooves 500, 510 may have any transverse cross-sectional shape. In one exemplary embodiment, as best shown in FIG. 8, the grooves 500, 510 may have a rounded or curved cross-sectional shape into the interior surface of the respective wall 312, 314. In other embodiments, the grooves 500, 510 may have an angled (or V-) shape, a squared (or U-) shape, or further type of shape. In some exemplary embodiments, each groove 500, 510 may have a predetermined width to depth ratio. For example, in the groove 500, 510 depicted in FIG. 8, the width 522 is approximately six times the depth 524. As an example, the depth 524 may be 0.01 inches and the width 522 may be 0.06 inches. In other embodiments, other width:depth ratios may be possible, including 2:1 or 3:1.

In further embodiments, the depth 524 and/or width 522 may be function of the thickness of the respective side wall 312, 314. For example, the side walls 312, 314 may need to have a minimum thickness for various reasons, such as performance, structural integrity, and/or manufacturing issues. Since the groove 500, 510 reduces the thickness of the side wall 312, 314, the depth 524 may be a function of the minimum thickness, which in turn, may impact other dimensions of the groove 500, 510.

In one exemplary embodiment, each groove 500, 510 may be generally identical or similar to one another in shape, dimensions, and/or arrangement. In other embodiments, the grooves 500, 510 may be similar to other grooves in the same row and different from grooves in the other row. Further, the characteristics of a particular groove 500, 510 may be a function of the radial position along the respective side wall 312, 314. In some exemplary embodiments, each groove 500, 510 may be individually tailored to meet the local or collective desired performance, cooling, efficiency, or manufacturing characteristics.

As noted above, the grooves 500, 510 may function to alter the flow path to minimize or mitigate the cross flow interaction of cooling air and spent cooling air. In particular, as the mass flow rate of spent air increases along the radial direction within the leading edge passage 416, this spent air may otherwise hinder the impinging jets to reach the surface of leading edge 316, e.g. as a cross flow effect, that would otherwise reduce the intended heat transfer between impinging jets and leading edge 316. However, the grooves 500, 510 function to accommodate the spent air within the volume of the grooves 500, 510 to enable cooling impingement jets to reach the surface of leading edge 316, e.g., as a spent flow path alteration. The grooves 500, 510 are superior to other configurations, such as ribs extending outwardly from the surface of the leading edge 316, as a result of this additional accommodation volume. Additionally, removal of material to form the grooves 500, 510 advantageously enables a lighter airfoil, and therefore, an improved efficiency. However, in some embodiments, the groves 500, 510 may be used in conjunction with intervening ribs.

Figure 9:
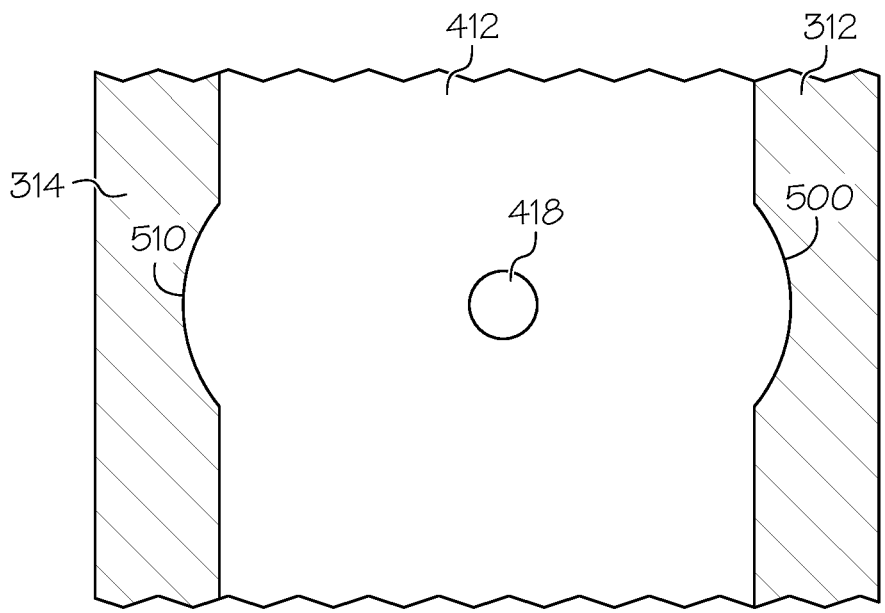
FIG. 9 is a more detailed view of a portion of the turbine rotor blade of FIG. 6 in accordance with an exemplary embodiment.

The number, arrangement, and position of the grooves 500, 510 may be dependent or otherwise associated with the cooling holes 418. Reference is made to FIG. 6 and additionally to FIG. 9, which is a more detailed view of a portion of FIG. 6. As best shown in FIG. 9, one groove 500 on the pressure side wall 312 and one groove 510 on the suction side wall 314 are associated with each cooling hole 418. In the depicted embodiment of FIG. 6, fourteen (14) cooling holes 418 are provided such that fourteen (14) grooves 500 and fourteen (14) grooves 510 are also provided. As a result of this arrangement, each groove 500 may be considered to have a corresponding pair groove 510 that are aligned. In the depicted embodiment as best shown in FIG. 5, the paired grooves 500, 510 (and the overall rows) are separated from one another along the interior surface of the leading edge 316 by a distance. This distance may vary, and in further embodiments, this distance may be eliminated such that otherwise paired grooves may be joined or unpaired grooves may partially overlap one another.

As also shown in FIGS. 6 and 9, the associated grooves 500, 510 may be approximately radially aligned with the respective cooling hole 418 (e.g., at the same radial distance from the hub and/or within the same axial-circumferential plane). In other embodiments, the corresponding grooves 500, 510 may be radially offset from the respective cooling hole 418, depending on the cooling characteristics. As a result of this arrangement, a groove 500, 510 is provided on either side of each hole 418 to assist the cooling function described above. In further embodiments, the densities of the grooves 500, 510 within each row may be increased or decreased relative to the cooling holes 418.

Figure 12:
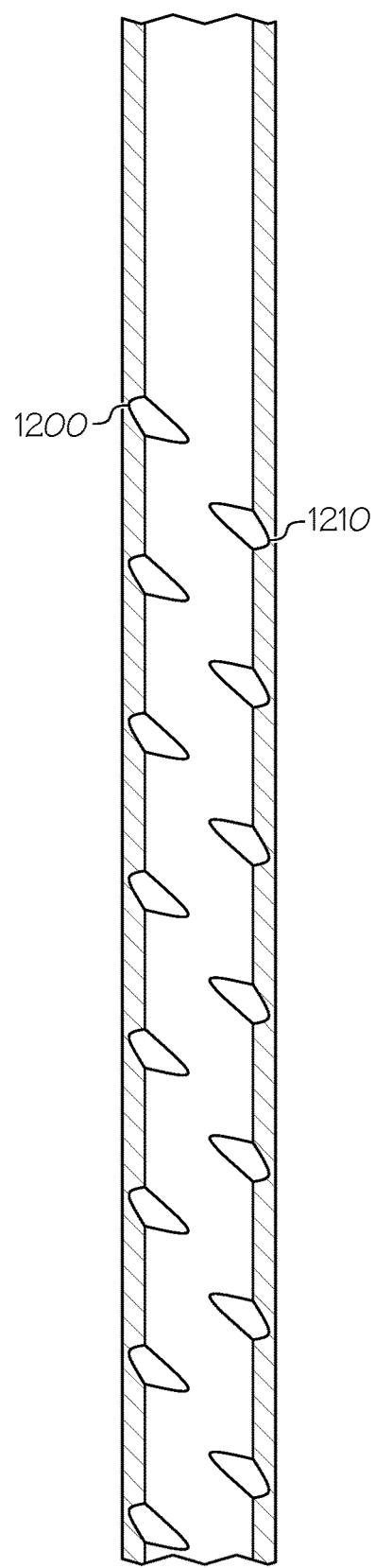
FIG. 12 is a partial sectional view of a turbine rotor blade in accordance with an alternate exemplary embodiment.

Reference is briefly made to FIG. 12, which is a partial sectional view of a turbine rotor blade in accordance with an alternate exemplary embodiment. The view of FIG. 12 generally corresponds to that of FIG. 5 in which grooves 1200, 1210 extend along the interior surface of the leading edge to generally function as described above. In this exemplary embodiment, one or more of the grooves 1200, 1210 is formed by angled side wall (e.g., that meet at a point instead of a continuous curve). Moreover, in this exemplary embodiment, the grooves 1200, 1210 with a respective row may be parallel to one another, the grooves 1200, 1210 within different rows are non-parallel to one another to result in an angle or tilt relative to a chordwise or axial direction. Finally, in this exemplary embodiment, the grooves 1200 on the first side of the leading edge are radially offset relative to the grooves 1210 on the second side of the leading edge.

Figure 10:
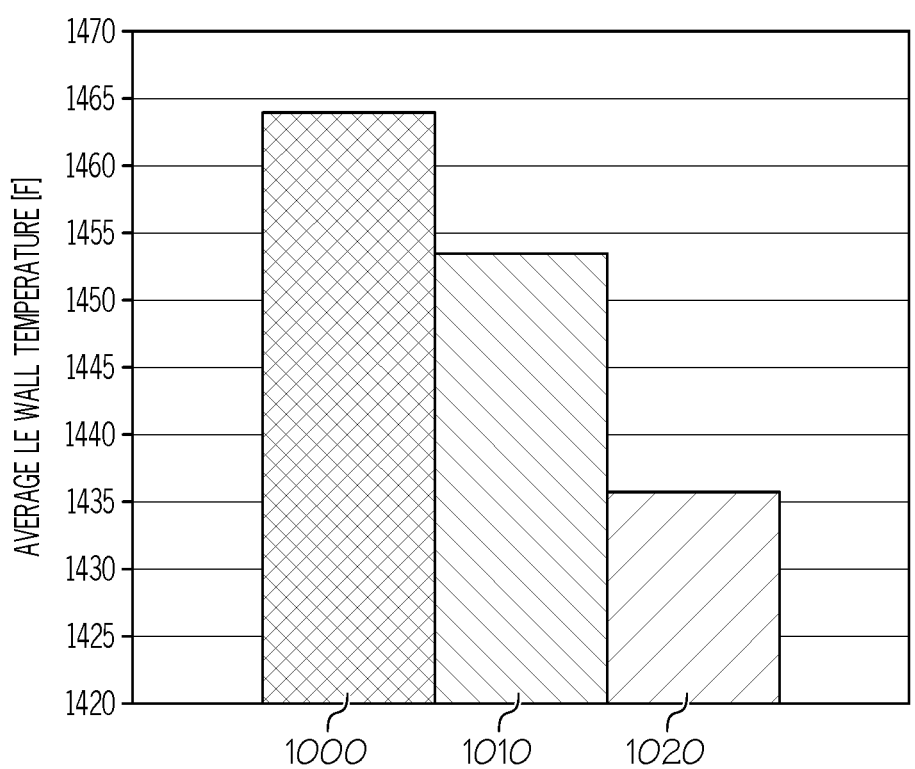
FIGS. 10 and 11 are charts depicting comparisons between conventional approaches and exemplary embodiments.
Figure 11:
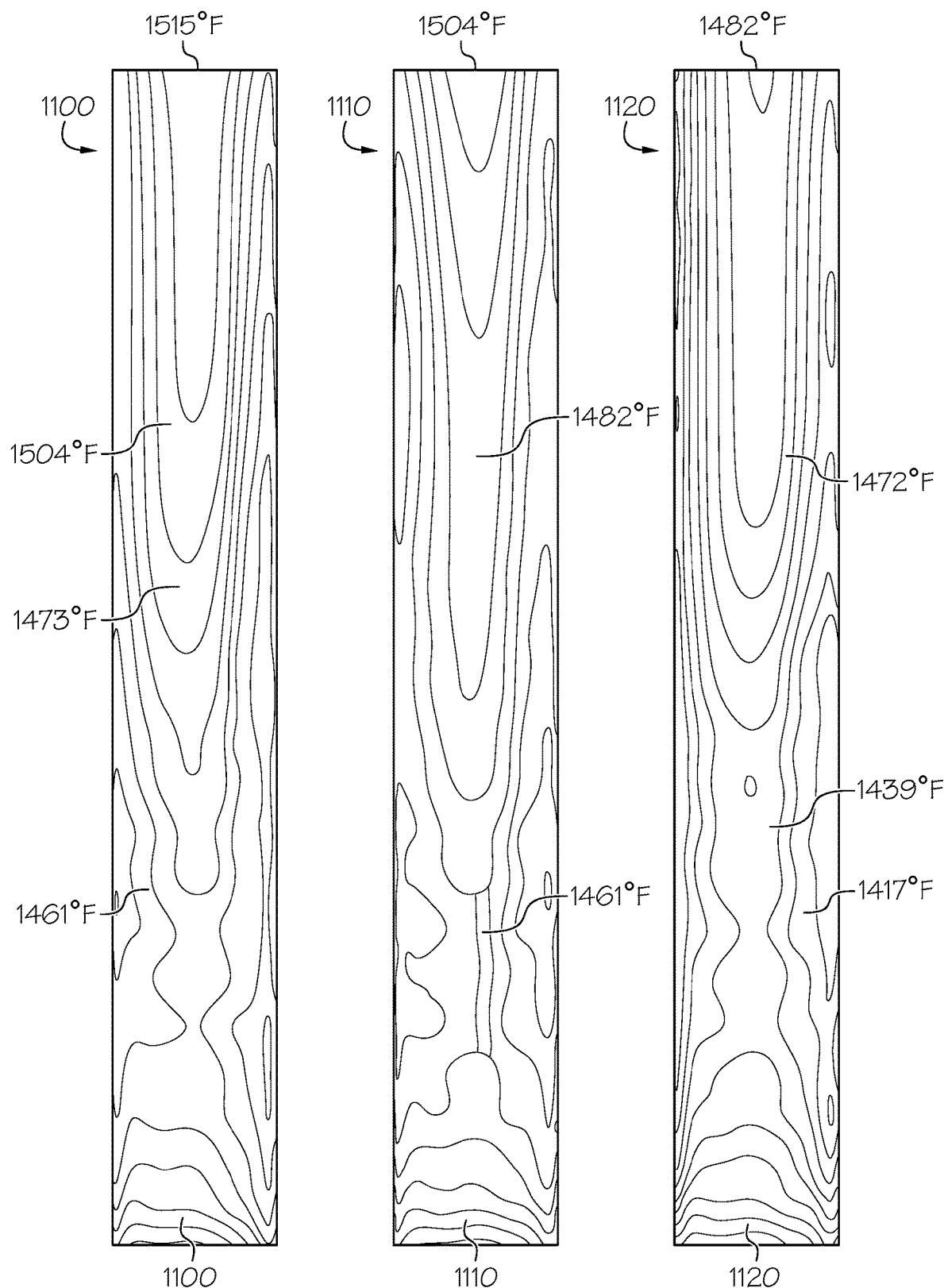

FIGS. 10 and 11 are charts comparing conventional approaches to cooling the leading edge to the exemplary embodiments discussed above in which grooves (e.g., grooves 500, 510) are provided on the internal surfaces of the leading edge of an airfoil. In the bar chart of FIG. 10, bar 1000 represents a baseline airfoil with smooth internal walls at the leading edge; bar 1010 represents an airfoil with ribs extending on the internal walls at the leading edge; and bar 1020 represents an airfoil with grooves on the internal walls at the leading edge according to an exemplary embodiment. As shown, bar 1020 indicates that the grooves result in a significant decrease in the average leading edge wall temperature relative to conventional approaches. In the chart of FIG. 11, temperature contours are depicted for three types of leading edge representations 1100, 1110, 1120. Leading edge representation 1100 corresponds to a leading edge of a baseline airfoil with smooth internal walls; leading edge representation 1110 represents an airfoil with ribs extending on the internal walls; and leading edge representation 1120 represents an airfoil with grooves on the internal walls according to an exemplary embodiment. On each of the leading edge representations 1100, 1110, 1120, the contour lines separate areas of different temperatures, and selected exemplary temperatures are indicated on the representations 1100, 1110, 1120. As shown by the leading edge representation 1120, the leading edge with grooves according to the exemplary embodiments discussed above results in a significant decrease in the temperatures across all areas of the leading edge surface.

Accordingly, turbine rotors with improved airfoil cooling are provided, particularly at the leading edge. Although airfoils with the grooves on the internal surface of the leading edge are described above with respect to a turbine blade, such grooves may also be incorporated into stator airfoils. Exemplary embodiments of the turbine airfoil discussed above have resulted in an ability to increase engine temperature, thereby improving fuel consumption and power density. The airfoils may be produced by any suitable manufacturing techniques, including casting, injection molding, and/or rapid prototyping. Computational fluid dynamic (CFD) analysis can additionally be used to optimize the location and orientation of the above-referenced grooves and cooling holes. Exemplary embodiments promote the service life and/or enhanced performance in a cost-effective manner. Each of the exemplary embodiments discussed above may be used in combination with one another. The turbine airfoils produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An airfoil for a gas turbine engine, comprising:
   a body comprising a first side wall and a second side wall joined at a leading edge and a trailing edge, the first side wall having a first interior surface and the second side wall having a second interior surface;
   an internal wall disposed within the body and extending between the first interior surface and the second interior surface to define a supply passage and a leading edge passage,
   wherein the internal wall defines a plurality of cooling holes to direct cooling air from the supply passage to the leading edge passage such that the cooling air impinges upon the leading edge; and
   a first plurality of grooves formed into the first interior surface by removing portions of the first interior surface such that the first side wall has a reduced thickness within respective grooves of the first plurality of grooves relative to areas in between the respective grooves and areas along and adjacent to the leading edge, each of the first plurality of grooves extending in a chordwise direction within the leading edge passage, wherein each of the first plurality of grooves is formed by a continuously concave curved side wall in cross-section along a radial direction.

2. The airfoil of claim 1, further comprising a second plurality of grooves formed into the second interior surface, each of the second plurality of grooves extending in the chordwise direction within the leading edge chamber from the internal wall and terminate at a second position upstream of the apex along the chordwise direction.

3. The airfoil of claim 1, wherein the first interior surface is generally flat between adjacent grooves of the first plurality of grooves.

4. The airfoil of claim 3, further comprising a second plurality of grooves formed in the second interior surface by removing portions of the second interior surface, each of the second plurality of grooves extending in the chordwise direction within the leading edge chamber.

5. The airfoil of claim 4, wherein the first plurality of grooves and the second plurality of grooves are aligned in the chordwise direction such that each of the first plurality of grooves shares the same radial position with a corresponding groove from the second plurality of grooves.

6. The airfoil of claim 4, wherein the first plurality of grooves and the second plurality of grooves are radially offset relative to one another.

7. The airfoil of claim 4, each of the plurality of cooling holes is associated with one of the first plurality of grooves and one of the second plurality of grooves.

8. The airfoil of claim 4, wherein each of the first plurality of grooves and each of the second plurality of grooves have approximately the same length.

9. The airfoil of claim 4, wherein each of the first plurality of grooves and each of the second plurality of grooves are parallel to one another.

10. The airfoil of claim 4, wherein the first plurality of grooves and the second plurality of grooves are non-parallel to one another.

11. The airfoil of claim 1, wherein:
each of the first plurality of grooves has a width and a depth; and
the width is approximately six times the depth.

12. The airfoil of claim 1, wherein a width of each of the first plurality of grooves decreases in the chordwise direction toward the leading edge and terminates with a closed groove end.

13. A gas turbine engine, comprising:
a compressor section configured to receive and compress air;
a combustion section coupled to the compressor section and configured to receive the compressed air, mix the compressed air with fuel, and ignite the compressed air and fuel mixture to produce combustion gases; and
a turbine section coupled to the combustion section and configured to receive the combustion gases, the turbine section defining a combustion gas path and comprising
a turbine rotor positioned within the combustion gas path, the turbine rotor comprising
a platform at least partially defining the combustion gas path; and
an airfoil extending from the platform, the airfoil including
a body comprising a first side wall and a second side wall joined at a leading edge and a trailing edge, the leading edge having an apex, and the first side wall having a first interior surface and the second side wall having a second interior surface;
an internal wall disposed within the body and extending between the first interior surface and the second interior surface to define a supply passage and a leading edge passage, wherein the internal wall defines a plurality of cooling holes to direct cooling air from the supply passage to the leading edge passage such that the cooling air impinges upon the leading edge; and
a first plurality of grooves formed into the first interior surface such that the first side wall has a reduced thickness within respective grooves of the first plurality of grooves relative to areas in between the respective grooves, each of the first plurality of grooves extending in a chordwise direction within the leading edge passage from the internal wall and terminate at a first position upstream of the apex along the chordwise direction, wherein each of the first plurality of grooves has a width and a depth, and wherein the width of each of the first plurality of grooves decreases in the chordwise direction toward the leading edge.

14. The gas turbine engine of claim 13, further comprising a second plurality of grooves formed into the second interior surface, each of the second plurality of grooves extending in the chordwise direction within the leading edge chamber from the internal wall and terminate at a second position upstream of the apex along the chordwise direction.

15. The gas turbine engine of claim 14, wherein each of the plurality of cooling holes is associated with one of the first plurality of grooves and one of the second plurality of grooves.

16. The gas turbine engine of claim 15, wherein the first plurality of grooves and the second plurality of grooves are aligned in the chordwise direction such that each of the first plurality of grooves shares the same radial position with, and extends parallel to, a corresponding groove from the second plurality of grooves.

17. The gas turbine engine of claim 14, wherein each of the first plurality of grooves and each of the second plurality of grooves have approximately the same length.

18. The gas turbine engine of claim 14, wherein, for each of the first plurality of grooves, the width is at least three times the depth.

19. The gas turbine engine of claim 14, wherein each of the first plurality of grooves and the second plurality of grooves is formed by a continuously concave curved side wall in cross-section along the radial direction.

20. A gas turbine engine, comprising:
a compressor section configured to receive and compress air;
a combustion section coupled to the compressor section and configured to receive the compressed air, mix the compressed air with fuel, and ignite the compressed air and fuel mixture to produce combustion gases; and
a turbine section coupled to the combustion section and configured to receive the combustion gases, the turbine section defining a combustion gas path and comprising
a turbine rotor positioned within the combustion gas path, the turbine rotor comprising
a platform at least partially defining the combustion gas path; and
an airfoil extending from the platform, the airfoil including
a body comprising a first side wall and a second side wall joined at a leading edge and a trailing edge, the leading edge having an apex, and the first side wall having a first interior surface and the second side wall having a second interior surface;
an internal wall disposed within the body and extending between the first interior surface and the second interior surface to define a supply passage and a leading edge passage, wherein the internal wall defines a plurality of cooling holes to direct cooling air from the supply passage to the leading edge passage such that the cooling air impinges upon the leading edge;
a first plurality of grooves formed into the first interior surface, each of the first plurality of grooves extending in a chordwise direction within the leading edge passage from the internal wall and terminate at a first position upstream of the apex along the chordwise direction,
wherein each of the first plurality of grooves has a width and a depth, and wherein the width of each of the first plurality of grooves decreases in the chordwise direction toward the leading edge.

* * * * *